(12) United States Patent
Belinsky

(10) Patent No.: US 8,056,071 B2
(45) Date of Patent: *Nov. 8, 2011

(54) METHOD, SYSTEM, AND COMPUTER PROGRAM PRODUCT FOR MANAGING FOREIGN HOLIDAYS FOR A COMPUTER APPLICATION BASED ON EMAIL

(75) Inventor: Eran Belinsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 465 days.

This patent is subject to a terminal disclaimer.

(21) Appl. No.: 12/355,229

(22) Filed: Jan. 16, 2009

(65) Prior Publication Data

US 2009/0271488 A1 Oct. 29, 2009

Related U.S. Application Data

(63) Continuation of application No. 12/107,871, filed on Apr. 23, 2008, now Pat. No. 7,506,333.

(51) Int. Cl.
*G06F 9/44* (2006.01)
(52) U.S. Cl. ...................................................... 717/168
(58) Field of Classification Search .................. None
See application file for complete search history.

(56) References Cited

U.S. PATENT DOCUMENTS

| | | | |
|---|---|---|---|
| 5,428,784 | A | 6/1995 | Cahill, Jr. |
| 5,555,191 | A | 9/1996 | Hripcsak |
| 5,719,826 | A | 2/1998 | Lips |
| 6,111,572 | A | 8/2000 | Blair et al. |
| 6,141,005 | A | 10/2000 | Hetherington et al. |
| 6,192,346 | B1 | 2/2001 | Green |
| 6,236,982 | B1 | 5/2001 | Mahajan et al. |
| 6,262,725 | B1 | 7/2001 | Hetherington et al. |
| 6,275,810 | B1 | 8/2001 | Hetherington et al. |
| 7,143,091 | B2 | 11/2006 | Charnock et al. |
| 7,305,437 | B2 | 12/2007 | Horvitz et al. |
| 2003/0014491 | A1 | 1/2003 | Horvitz et al. |
| 2007/0071209 | A1 | 3/2007 | Horvitz et al. |
| 2007/0168869 | A1 | 7/2007 | Vaidya |

*Primary Examiner* — James Rutten
(74) *Attorney, Agent, or Firm* — Tutunjian & Bitetto, P.C.; Imogene Friedman

(57) ABSTRACT

A method, system, and computer program product are provided for managing foreign holidays. The system includes a processor configured to receive email information relating to foreign countries that a user communicates with, calculate based on the email information a respective count for each foreign country, and compare the respective count to a threshold. The processor is also configured to offer the user an option to add foreign holidays corresponding to a particular foreign country to the computer application when the respective count for the particular foreign country exceeds the threshold, and offer the user an option to specify a different country than an actual originating country. The respective count is respectively calculated for the actual originating country and for the different country to allow consideration of both a home country as the different country and a visiting country as the actual originating country for a particular individual.

1 Claim, 3 Drawing Sheets

METHOD, SYSTEM, AND COMPUTER PROGRAM PRODUCT FOR MANAGING FOREIGN HOLIDAYS FOR A COMPUTER APPLICATION BASED ON EMAIL

RELATED APPLICATION INFORMATION

This application is a Continuation application of U.S. Ser. No. 12/107,871 now U.S. Pat. No. 7,506,333 filed on Apr. 23, 2008, incorporated herein by reference in its entirety.

BACKGROUND

1. Technical Field

The present invention relates to a method, a system, and a computer program product for managing foreign holidays for a computer application based on email.

2. Description of the Related Art

When working in a global world, one may have to manage correspondence with people from different countries all over the world. Tools exist to calculate time differences between time zones. However, we are not always aware of special days when people in other countries are not working and, thus, are probably not available for calls or prompt email responses. Some solutions exist for adding certain holidays to a calendar. For example, one simple solution is to locate the holidays of other countries (hereinafter also referred to as "foreign holidays") manually, for example on the web, and add them manually to our calendar. However, we will probably do so only after we first have a mishap caused by this lack of information, and this certainly does not offer automation of such a process.

There is a need to provide a way to add foreign holidays to a computer application.

SUMMARY

The shortcomings of the prior art are overcome and additional advantages are provided through the provision of a method, a system, and computer program product for managing foreign holidays for a computer application based on email.

According to an aspect of the present principles, there is provided a system for managing foreign holidays for a computer application. The system includes a processor configured to receive email information relating to foreign countries that a user communicates with. The processor is configured to calculate, based on the email information, a respective count for each of the foreign countries that indicates a number of times the user has communicated with respect to the foreign countries. The processor is configured to compare the respective count for each of the foreign countries to a threshold. The processor is configured to offer the user an option to add one or more foreign holidays corresponding to a particular one of the foreign countries to the computer application, when the respective count for the particular one of the foreign countries exceeds the threshold. The processor is configured to offer the user an option to specify a different country than an actual originating country from among the foreign countries that the user communicates with. The respective count is respectively calculated for the actual originating country and for the different country to allow consideration of both a home country as the different country and a visiting country as the actual originating country for a particular individual.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
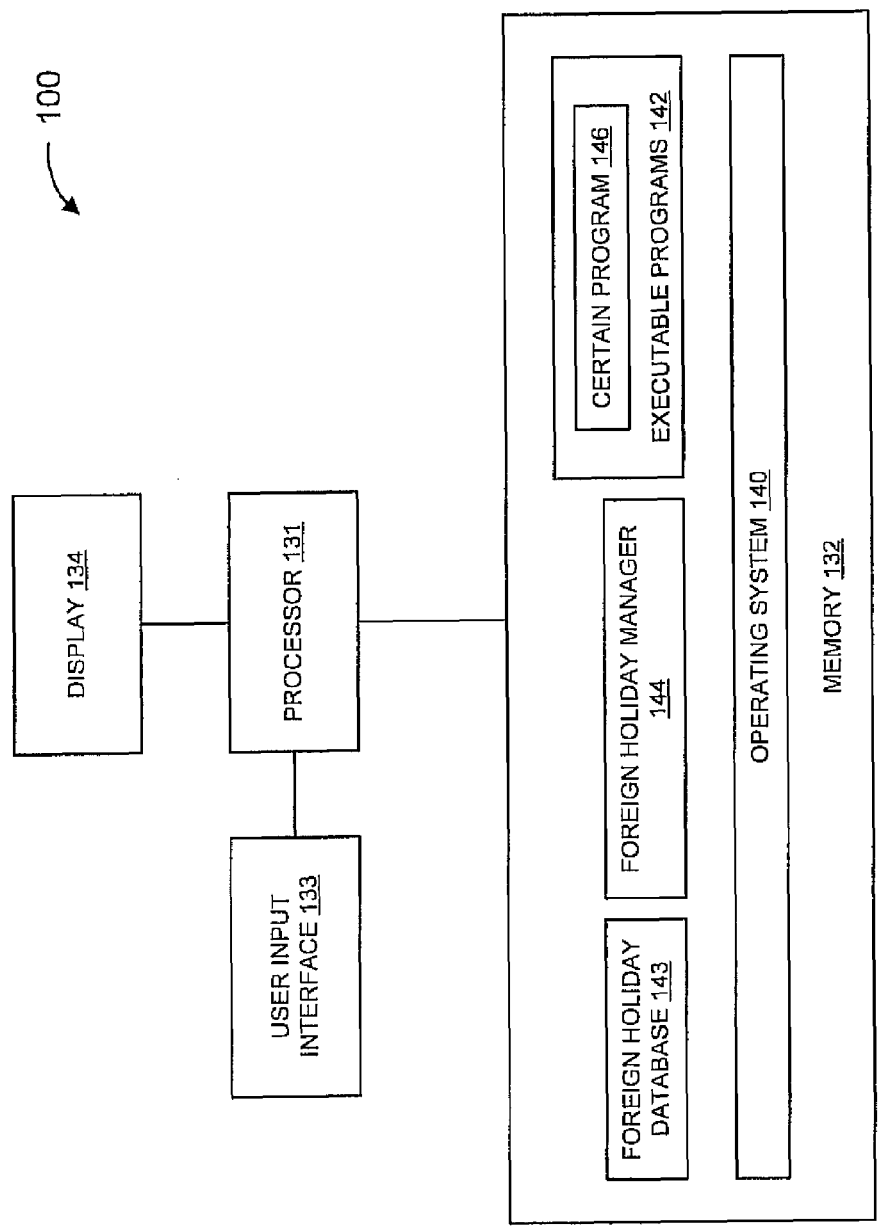
FIG. 1 illustrates an exemplary system having foreign holiday managing capabilities, according to an embodiment of the present principles.

Referring now in detail to the figures in which like numerals represent the same or similar elements and initially to FIG. 1, an exemplary system having foreign holiday managing capabilities is indicated generally by the reference numeral 100.

System 100 may represent practically any type of computer, computer system or other programmable electronic system. System 100 may be connected to a network or may be a stand-alone system in the alternative.

System 100 includes a processor 131 that is connected to a memory unit 132, user input interface component 133 and display 134. System 100 can be connected to other devices via wired and/or wireless links. It is to be noted that system 100 can be characterized by a centralized architecture but that it can also be characterized by a distributed architecture. Accordingly, the various components of system 100 can be located near each other, but this is not necessarily so.

User input interface component 133 can be a keyboard, a mouse, a joystick, a touchpad, a microphone, a gesture recognition device, or a combination thereof. It is to be noted that, depending upon the embodiment, some of the above mentioned components may be optional.

According to a first embodiment of the invention, system 100 operates under the control of operating system 140, and executes various computer software applications, components, programs, objects, modules, and so forth, such as but not limited to executable programs 142, and foreign holiday manager 144.

Conveniently, system 100 can be controlled by multiple operating systems that in turn are monitored by a hypervisor. For simplicity of explanation, FIG. 1 illustrates a single operating system.

For simplicity of explanation it is assumed that foreign holiday manager 144 is used to identify and manage foreign holidays for a certain program (such as 146) out of executable programs 142. Certain program may be, but is not limited to, a calendar program, an email program, a combination of the preceding, and so forth. In fact, in an embodiment, certain program 146 may involve two or more programs, for example a calendar program and a separate email program, where data from the email program is used to manage holidays for the calendar program. These and other variations are readily contemplated by one of ordinary skill in this and related arts given the teachings of the present principles provided herein, while maintaining the spirit of the present principles.

In an embodiment, foreign holiday manager 144 may include a foreign holiday database 143. In an embodiment, foreign holiday database 143 may be used to determine foreign holidays for particular countries of interest and the days on which the foreign holidays occur. Alternatively, foreign holiday database 143 may be implemented as a separate entity with respect to foreign holiday manager 144. Moreover, it is to be appreciated that the present principles are not limited to the use of foreign holiday database 143 to determine foreign holidays and the days on which they occur and, thus, other sources for such information (e.g., the Internet) may also be employed, while maintaining the spirit of the present principles.

Figure 2:
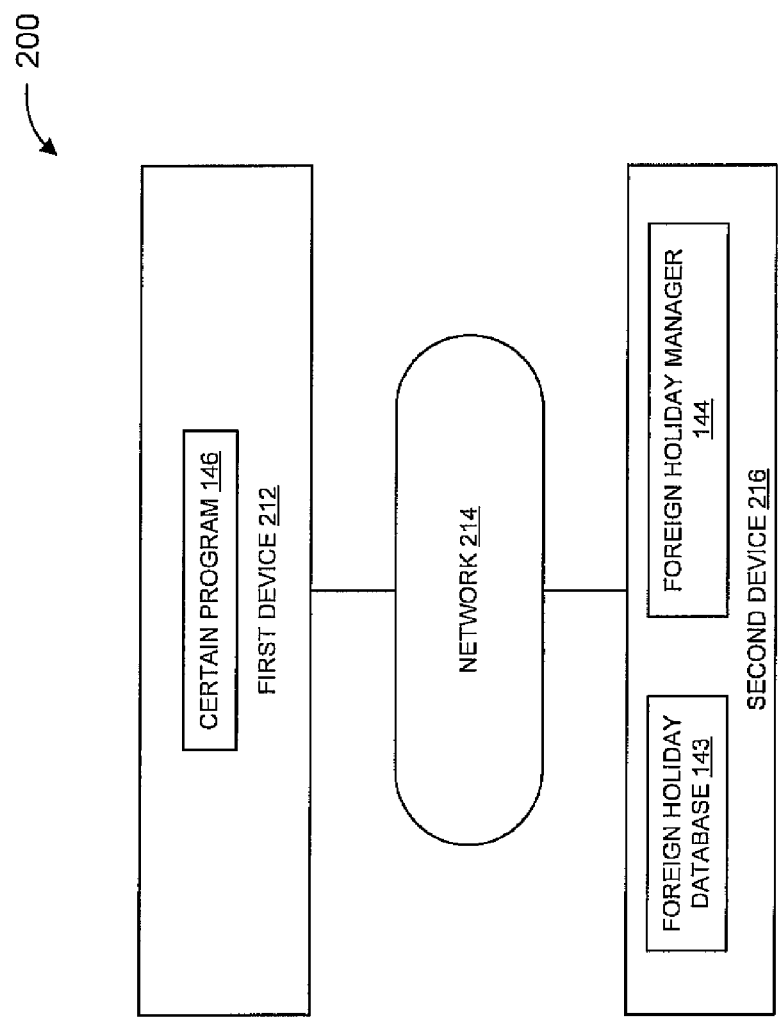
FIG. 2 illustrates another exemplary system having foreign holiday managing capabilities, according to an embodiment of the present principles.

According to another embodiment of the invention, foreign holiday manager 144 and certain program 146 (the latter, to which foreign holiday manager may be applied) are stored at different devices, as illustrated in FIG. 2. Referring to FIG. 2, another exemplary system having foreign holiday management capabilities is indicated generally by the reference numeral 200. In system 200, first device 212 can send, over network 214, actual emails received by certain program 146 and/or representative information (for example, as summarized and/or otherwise collected together in a single output file) to second device 216. Second device 216 can then execute foreign holiday manager 144 to manage foreign holidays for certain program 146. The results of the management (including, for example, names and dates of certain foreign holidays that may be added/removed/and so forth from certain program 146) can be sent, over network, 214, to first device 212. It is noted that first device 212 and second device 216 can include additional components such as a display, a user input interface, a processor, a memory and that they can store an operating system and executable programs.

Referring back to FIG. 1, the execution of foreign holiday manager 144 can be triggered in response to a user request, can be triggered in response to an occurrence of one or more certain events (such as but not limited to the receipt of an email from a foreign country by certain application 146), or can be triggered in view of a combination of both. Of course, other triggers may also be employed, while maintaining the spirit of the present principles.

It is to be appreciated that while one or more embodiments of the present principles use information that is obtained from emails (and, thus, it is possible to directly or indirectly receive the same from an email program), the present principles may be directed to one or more other programs. For example, while one or more embodiments of the present principles may interface with and/or otherwise communicate with an email program to receive information relating to emails received and/or sent by a user, the present principles may also be applied to a calendar program, so that a corresponding calendar will include newly added foreign holidays for countries identified with respect to the emails and/or other information provided by the email program, while maintaining the spirit of the present principles.

Figure 3:
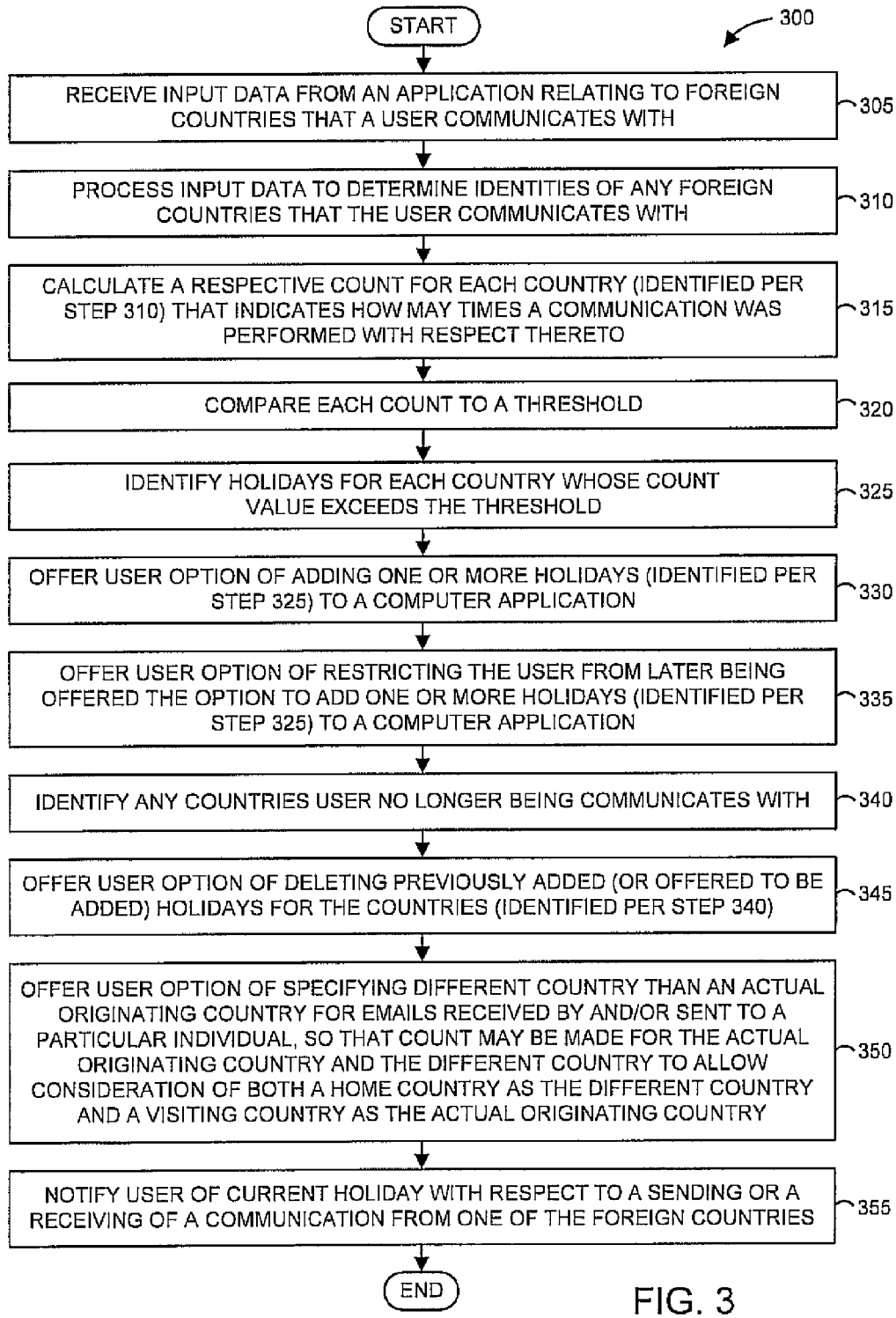
FIG. 3 illustrates an exemplary method for managing foreign holidays for a computer application, according to an embodiment of the present principles.

FIG. 3 is a flow chart of method 100 for managing foreign holidays for a computer application, according to an embodiment of the invention. The method 300 includes receiving input data from an application (e.g., an email program) relating to foreign countries that a user communicates with at step 305.

At step 310, the input data is processed to determine the identities of any foreign countries that the user communicates with. It is to be appreciated that step 310 may be performed in a variety of ways and, hence, the present principles are not limited to any particular way of using email to determine the identities of foreign countries that the user communicates with. In an embodiment, the input data is simply parsed to identify any foreign countries mentioned therein. This approach could be used for example, since emails originating from the uk might include a .uk suffix (e.g., elizabeth_2@buckingham.org.uk). In another embodiment, we can reverse-interpret the originating IP address of the sender. For example, for a given originating IP address such as 123.123.123.123, a reverse lookup is performed to determine that this IP belongs to a company in the UK. Of course, other processing and/or approaches may also be performed in accordance with the present principles, while maintaining the spirit of the present principles.

At step 315, a respective count is calculated for each country (identified per step 310) that indicates how many times a communication was performed with respect thereto. It is to be appreciated that the count may be an overall count, or may be based on a time period.

At step 320, each count (for a particular country) is compared to a threshold.

At step 325, holidays for each country whose corresponding count value exceeded the threshold (per step 320) are identified.

At step 330, the user is offered the option of adding one or more of the identified holidays (per step 325) to a computer application (for example, a calendar program, an email program, a combination program, and so forth).

At step 335, the user is offered the option of restricting the user from being later offered the option to add the one or more of the identified holidays (per step 325) to a computer application.

At step 340, any countries, having had holidays previously added (or offered to be added) with respect thereto, and that the user no longer communicates with, are identified. Such identification may be made, for example, based on a time period (e.g., last six months, and so forth).

At step 345, the user is offered the option of deleting the previously added holidays for the identified countries (per step 340), if any, no longer being communicated with by the user.

At step 350, the user is offered the option of specifying a different country than an actual originating country (and thus identified per step 310) for emails received from and/or sent to a particular individual (thus essentially changing the name of the country that is being further processed in accordance with the present principles). The user may be further offered the option to use (i.e., manage) the holidays for the different country (versus the actual originating country) irrespective of whether any holidays are being managed for the actual originating country. It is to be appreciated that a respective count may be calculated per step 315 for the actual originating country and another respective count may be calculated for a different country (or for only one of these countries, depending upon user preference), with further processing for each as described herein. In the former case, the two respective counts take into consideration that the individual will likely still observe his or her own holidays from their own home country (here, the "different country") while still observing any holidays in the country in which they are visiting (here, the "actual originating country"). It is to be appreciated that the preceding may encompass the case where neither the actual originating country nor the different country corresponding to the individual are the same country that the user is in. Of course, in another case, one of the different country or the actual originating country may be the same country that the user is in. Further, the different country may be a country where a communication was never sent to and/or received from with respect to the user.

At step 355, the user is notified of a current holiday with respect to a sending or a receiving of a communication to/from a corresponding one of the foreign countries.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As used herein, the word "managing" as used with respect to foreign holidays, refers to one or more of identifying, adding, deleting, replacing, and so forth foreign holidays with respect to countries identified in accordance with the present principles. Such managing may be performed with respect to a computer application including, but not limited to, an email program, a calendar program, a combination of the preceding, and so forth.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The idea is to track a person's mailbox and see which countries are corresponded with. Periodically, if the correspondence with recipients from a certain country (holidays of which are not in the calendar) is over a set threshold, the system will suggest adding that country's holidays.

Some email addresses include an implicit country (e.g., ones ending with .uk are from the United Kingdom) while others may require consulting the Internet in order to extract their origins (a process that can easily be automated). Once this information is obtained and tracked, an agent that runs periodically can sum the number of correspondences with every country and check it versus a given threshold (or any other metric). If the result is positive, and the country's holidays are not in the calendar, the agent can offer the user the option to add that country's holidays to the calendar. The user can accept or decline the offer. Further management features can include allowing the user to specify to never suggest (e.g., to restrict) adding holidays for a given country, and so forth.

In an embodiment, we could notify the sender when sending to a recipient who is currently (according to country information) on a holiday, and let the sender decide what to do. For example, the sender can be provided with options including, but not limited to, sending now, postponing the send, or something else.

In an embodiment, we could detect when there is no more correspondence with people from a given country and, as a result, the system can suggest removing the holidays for that country.

In an embodiment, we could handle cases where the originating country is not the same as the actually country (e.g., a visiting professor using her home country email address). In such cases, the user could, for example, request evidence supporting the same, and correct the system with the right location information for one or more email addresses.

One or more embodiments could be extended to include out-of-office information received from the recipient. The out-of-office information may be received, for example, directly or indirectly (e.g., through the email system), and/or internally or externally with respect to the system providing the foreign holiday management capabilities.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for managing foreign holidays for a computer application, comprising:
a processor configured to perform at least the following:
receive email information relating to foreign countries that a user communicates with;
calculate, based on the email information, a respective count for each of the foreign countries that indicates a number of times the user has communicated with respect to the foreign countries;
compare the respective count for each of the foreign countries to a threshold;
offer the user an option to add one or more foreign holidays corresponding to a particular one of the foreign countries to the computer application, when the respective count for the particular one of the foreign countries exceeds the threshold; and
offer the user an option to specify a different country than an actual originating country from among the foreign countries that the user communicates with, and
wherein the respective count is respectively calculated for the actual originating country and for the different country to allow consideration of both a home country as the different country and a visiting country as the actual originating country for a particular individual.

* * * * *